United States Patent
Kaplan

(10) Patent No.: US 10,101,828 B2
(45) Date of Patent: Oct. 16, 2018

(54) PEN WAKE UP ON SCREEN DETECT

(71) Applicant: Microsoft Technology Licensing, LLC, Redmond, WA (US)

(72) Inventor: Ron Kaplan, Ness Ziona (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 117 days.

(21) Appl. No.: 15/234,320

(22) Filed: Aug. 11, 2016

(65) Prior Publication Data

US 2018/0046269 A1   Feb. 15, 2018

(51) Int. Cl.
*G06F 3/038* (2013.01)
*G06F 3/0354* (2013.01)
*G06F 3/041* (2006.01)

(52) U.S. Cl.
CPC ........ *G06F 3/0383* (2013.01); *G06F 3/03545* (2013.01); *G06F 3/0416* (2013.01)

(58) Field of Classification Search
CPC ...... G06F 3/0317; G06F 3/0321; G06F 3/033; G06F 3/03542; G06F 3/03545–3/03546; G06F 3/037; G06F 3/0386
See application file for complete search history.

(56) References Cited

U.S. PATENT DOCUMENTS

| | | | |
|---|---|---|---|
| 6,529,189 B1 | 3/2003 | Colgan et al. | |
| 9,063,731 B2 | 6/2015 | Heo et al. | |
| 9,081,569 B2 | 7/2015 | Mercea et al. | |
| 9,256,335 B2 | 2/2016 | Jain et al. | |
| 9,304,609 B2 | 4/2016 | Nakao | |
| 9,329,703 B2 | 5/2016 | Falkenburg et al. | |
| 2005/0200291 A1 | 9/2005 | Naugler et al. | |
| 2010/0167783 A1 | 7/2010 | Alameh et al. | |
| 2012/0013555 A1 | 1/2012 | Maeda et al. | |
| 2013/0106714 A1 | 5/2013 | Shahpamia et al. | |

(Continued)

FOREIGN PATENT DOCUMENTS

| | | |
|---|---|---|
| WO | 2008002239 A1 | 1/2008 |
| WO | 2015036999 A1 | 3/2015 |

OTHER PUBLICATIONS

"PenVision™ Note Taking Mobile Digital Pen", Published on: Mar. 1, 2010 Available at: http://www.okion.com/en-us/scripts/product_info.asp?pid=582.

(Continued)

*Primary Examiner* — Gene W Lee
(74) *Attorney, Agent, or Firm* — NovoTechIP International PLLC

(57) ABSTRACT

A stylus that receives a signal transmitted by a digitizer and processes the received signal to control a state of the stylus is described. In implementations, a detector circuit in the stylus detects a signal emitted from a transmitter of the digitizer and toggles a state of the stylus between multiple states supported by the stylus. In implementations, the state of the stylus toggles between the multiple states in dependence upon a peak voltage associated with the detected signal. The stylus can also or instead be implemented to toggle a state of the stylus between the multiple states in dependence upon a relative proximity of the stylus to a digitizer. Different battery usage and conservation modes can be implemented in dependence upon a state of the stylus.

20 Claims, 7 Drawing Sheets

(56) References Cited

U.S. PATENT DOCUMENTS

| | | | |
|---|---|---|---|
| 2013/0106715 A1* | 5/2013 | Shahparnia | G06F 3/03545 345/173 |
| 2013/0114380 A1 | 5/2013 | Bryger et al. | |
| 2013/0337747 A1* | 12/2013 | Lee | G06F 3/0488 455/41.2 |
| 2014/0210781 A1 | 7/2014 | Stern | |
| 2014/0267184 A1 | 9/2014 | Bathiche et al. | |
| 2015/0363012 A1* | 12/2015 | Sundara-Rajan | G06F 3/038 345/179 |
| 2016/0209940 A1* | 7/2016 | Geller | G06F 3/0416 |

OTHER PUBLICATIONS

"International Search Report and Written Opinion Issued in PCT Application No. PCT/US2017/045400", dated Oct. 26, 2017, 13 Pages.

* cited by examiner

US 10,101,828 B2

PEN WAKE UP ON SCREEN DETECT

BACKGROUND

Techniques that may be used to interact with computing devices are ever increasing. For instance, a stylus may be used to interact with a user interface of a computing device. Some example interactions by a stylus may include entering text, making selections, or providing input to a touch screen. A stylus can also be used as a digital pen to provide a user with hand writing experience. To enable these and other interactions, the stylus requires power. However, traditional techniques to power the stylus are inefficient and can limit the effective use of the stylus.

For example, a battery used to power the stylus has a limited time during which it can provide power to the stylus to support various interactions. A traditional technique to manage power for a stylus and maximize battery life involves using motion detection to decide when to toggle power on and off. However, the stylus may unintentionally toggle on due to movement of the stylus that is not intended to wake the stylus resulting in excessive battery drain. For example, motion detected when the stylus is being transported in a bag or being moved in vehicle may cause the stylus to wake up. Other techniques that rely on grip/touch sensors or toggle switches may be subject errors such as missed detections (e.g., a user wearing a glove), inadvertent switching, false detections due to holding a stylus while not in use, as so forth. Thus, traditional techniques used for stylus battery management may be ineffective and can lead to user frustration if the stylus battery is drained too quickly or the stylus is out of power when the user attempts to use stylus. Further, traditional techniques to power a stylus include using a battery that limits the design of the stylus due to a size, capacity, or shape of the battery.

SUMMARY

A stylus that receives a signal transmitted by a digitizer and processes the received signal to control a state of the stylus is described. In implementations, a detector circuit associated with the stylus is configured to compute a peak voltage for an emitted signal over a particular time period. Control circuitry of the stylus may then selectively toggle the state of the stylus between multiple states supported by the stylus in dependence upon the peak voltage.

A stylus can be configured to perform signal detection techniques including detecting a signal emitted by a transmitter associated with a digitizer to provide indications of a position of the digitizer relative to a position of the stylus. In implementations, the stylus also measures a strength of the signal, determines a relative proximity of the stylus to the digitizer based on a correlation between the measured strength of the signal and a relative proximity threshold, and toggles the state of the stylus between the multiple states in dependence upon the relative proximity of the stylus to the digitizer. In implementations, a circuit is disposed in a stylus that is operable to aggregate signal data emitted from a transmitter integrated with a display device, calculate a value that represents an amplitude of the aggregated signal data over a particular time period, and compare the calculated value to one or more pre-defined threshold values correlated to different states supported by the stylus. The circuit disposed in the stylus may also ascertain a particular state for the stylus that is correlated to the calculated value according to the comparison and cause the stylus to operate in the particular state.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
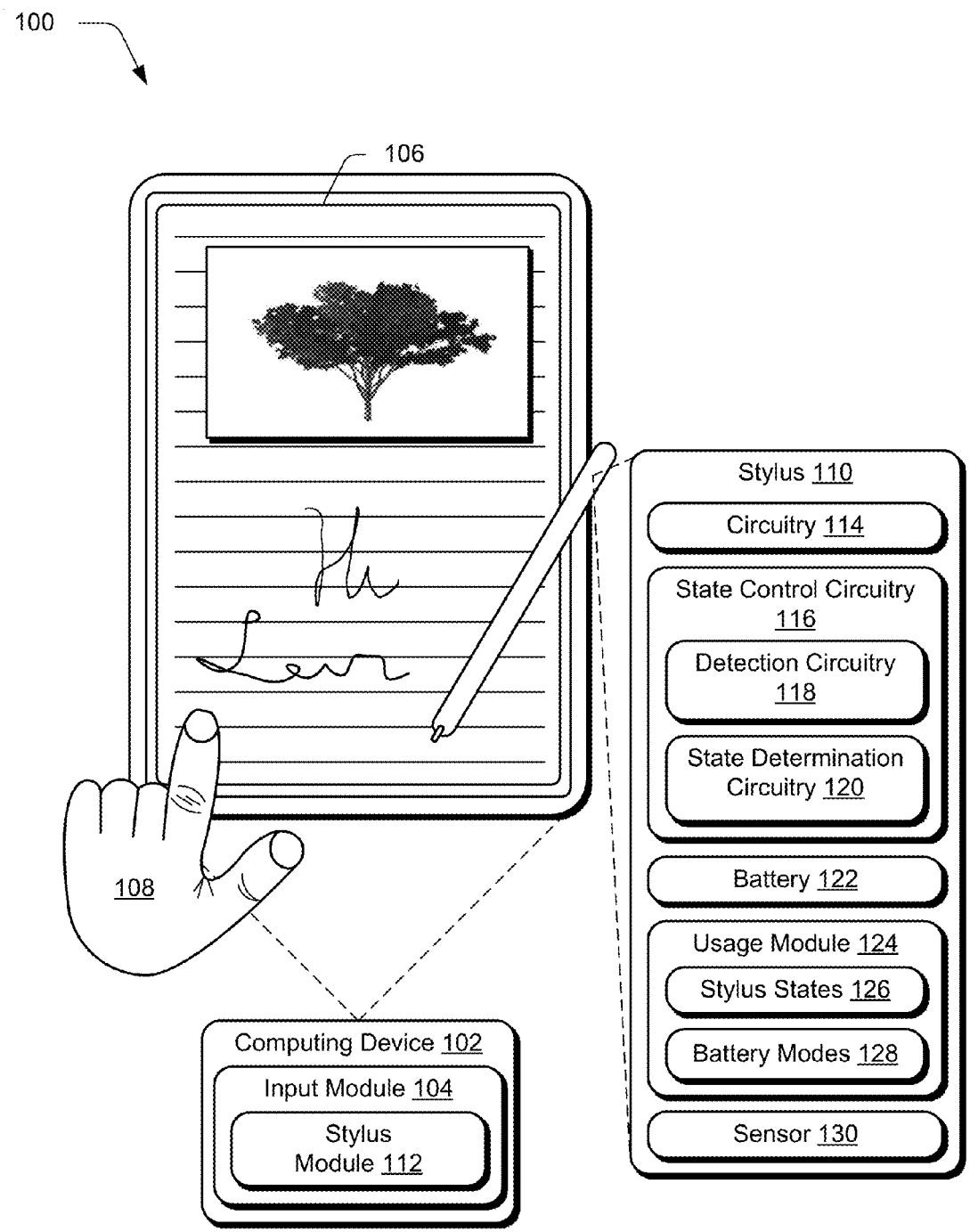
FIG. 1 is an illustration of an environment in an example implementation that is operable to employ techniques described herein.

Traditional techniques to manage power for a stylus may use motion detection to toggle power on or off depending on whether the stylus is moving or at rest. However, movement of the stylus that is not intended to 'wake' the stylus from a battery preserving state often occurs when the stylus is being transported. Further, techniques that rely on a grip/touch sensors or switches are subject to missed detections (e.g., a user wearing a glove), inadvertent switching, and false touch detections. Thus, traditional techniques to manage power for a stylus may be inefficient, and cause user frustration due to excessive battery drain.

A stylus that receives a signal transmitted by a digitizer and processes the received signal to control a state of the stylus is described. In implementations, a detector circuit in the stylus detects a signal emitted from a transmitter of the digitizer and toggles a state of the stylus between multiple states supported by the stylus. In implementations, the state of the stylus toggles between the multiple states in dependence upon a peak voltage associated with the detected signal. In one approach, the stylus compares the peak voltage for the detected signal to a noise threshold value to determine a particular state and then causes the stylus to be in the particular state based on the comparison. In this way, the detector circuit may cause the stylus to operate in a particular state according to a detected signal from a digitizer.

The stylus can also be implemented to toggle a state of the stylus between multiple states supported by the stylus in dependence upon a relative proximity of the stylus to a digitizer. In implementations, the stylus obtains indications of a position of a digitizer relative to the stylus by processing a received signal. The stylus also measures a strength of the signal, determines a relative proximity of the stylus to the digitizer based on a correlation between the measured strength of the signal and a relative proximity threshold, and toggles the state of the stylus between the multiple states in dependence upon the relative proximity of the stylus to the digitizer. In this way, the stylus can toggle (e.g., enter into, switch to,) to or remain operating in a particular state depending upon a position of the stylus to the digitizer.

In implementations, a circuit disposed in a stylus is configured to aggregate signal data emitted from a transmitter integrated with a display device, calculate a value that represents an amplitude of the aggregated signal data over a particular time frame, and compare the calculated value to one or more pre-defined threshold values correlated to different states supported by the stylus. In implementations, the circuit also ascertains a particular state for a stylus and controls whether the stylus is in the particular state.

Using the described circuitry and techniques, the stylus can perform various signal detection and processing techniques that cause the stylus to enter, switch to, remain in or otherwise operate in a particular state. Depending on the particular state that the stylus is in, different battery modes may be employed for use by the stylus. For instance, responsive to determining a particular state, circuitry described herein can cause the stylus to enter the particular state which in turn can cause a battery supplying power to the stylus to enter a corresponding battery mode. Generally, the circuitry can be implemented in a stylus to determine a state and to use the state to implement battery management techniques. The battery management techniques implemented by the circuitry enable the stylus to be designed in various ways that are independent of a size, capacity, or shape of the battery.

Employing the circuitry and techniques described herein enables detection of low frequency and high frequency signals emitted from a digitizer. For instance, the digitizer can emit both low and high frequency signals through different transmitters and/or antennae, and the circuitry is configured to detect and process these signals to determine a stylus state and a stylus battery mode. When a low frequency signal is detected, for example, the circuit can apply filtering, aggregating, and comparing techniques to the detected signal to determine a state for the stylus. Techniques for low and high frequency implementations using the circuitry are discussed below.

In the following discussion, an example environment is first described that may employ the techniques described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Environment

FIG. 1 is an illustration of an environment 100 in an example implementation that is operable to employ stylus techniques. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is illustrated as including an input module 104. The input module 104 is representative of functionality relating to inputs of the computing device 102. For example, the input module 104 may be configured to receive inputs from a keyboard, mouse, to identify gestures and cause operations to be performed that correspond to the gestures, and so on. The inputs may be identified by the input module 104 in a variety of different ways.

For example, the input module 104 may be configured to recognize an input received via touchscreen functionality of a display device 106, such as a finger of a user's hand 108 as proximal to the display device 106 of the computing device 102, from a stylus 110, and so on. The input may take a variety of different forms, such as to recognize movement of the stylus 110 and/or a finger of the user's hand 108 across the display device 106, such as a tap, drawing of a line, and so on. In implementations, these inputs may be recognized as gestures.

A variety of different types of gestures may be recognized, such a gestures that are recognized from a single type of input (e.g., touch gestures) as well as gestures involving multiple types of inputs. For example, the computing device 102 may be configured to detect and differentiate between a touch input (e.g., provided by one or more fingers of the user's hand 108) and a stylus input (e.g., provided by a stylus 110). The differentiation may be performed in a variety of ways, such as by detecting an amount of the display device 106 that is contacted by the finger of the user's hand 108 versus an amount of the display device 106 that is contacted by the stylus 110. Differentiation may also be performed through use of a camera to distinguish a touch input (e.g., holding up one or more fingers) from a stylus input (e.g., holding two fingers together to indicate a point) in a natural user interface (NUI).

Thus, the input module 104 may support a variety of different gesture techniques by recognizing and leveraging a division between stylus and touch inputs. For instance, the input module 104 may be configured to recognize the stylus as a writing tool, whereas touch is employed to manipulate objects displayed by the display device 106. Consequently, the combination of touch and stylus inputs may serve as a basis to indicate a variety of different gestures. For instance, primitives of touch (e.g., tap, hold, two-finger hold, grab, cross, pinch, hand or finger postures, and so on) and stylus (e.g., tap, hold-and-drag-off, drag-into, cross, stroke) may be composed to create a space involving a plurality of gestures. It should be noted that by differentiating between stylus and touch inputs, the number of gestures that are made possible by each of these inputs alone is also increased. For example, although the movements may be the same, different gestures (or different parameters to analogous commands) may be indicated using touch inputs versus stylus inputs.

The computing device 102 is further illustrated as including a stylus module 112. The stylus module 112 is representative of functionality of the computing device relating to the stylus 110. For example, the stylus module 112 may be configured to perform one or more actions responsive to the stylus 110, such as to draw lines as illustrated by the handwritten freeform lines in the display device 106 that illustrate "Hi" and "Levi."

Thus, the stylus module 112 may be configured to perform a variety of different writing operations, such as to draw a line to mimic a pencil, pen, brush, and so on. The stylus module 112 may also recognize the stylus 110 to perform erase operations, such as to mimic a rubber eraser and erase portions of a user interface. Thus, the stylus module 112 may provide interaction via the stylus 110 that is intuitive and natural to a user.

To increase an ability of the stylus module 112 to recognize the stylus 110, the stylus 110 may include a variety of different types of circuitry 114. For example, the circuitry 114 may include location-assistance circuitry (not shown) to aid the stylus module 112 in determining an XY location of the stylus 110 in relation to the display device 106. In an implementation, the circuitry 114 may also include a radio (not shown) to support communication with the stylus module 112, such as to communicate data used in determination of the XY location.

The stylus 110 is also illustrated as including state control circuitry 116 for employing various techniques described herein. In an implementation, the state control circuitry 116 detects a signal emitted from the display device 106 and processes the detected signal to control a state of the stylus 110. For example, the state control circuitry 116 may include detection circuitry 118 for detecting and/or receiving signals in various frequency ranges and state determination circuitry 120 for processing the detected signals to determine a particular state for the stylus 110. In an implementation, the state control circuitry 116 communicates (e.g., exchanges data) with other circuits and/or modules of the stylus 110 to cause the stylus to enter the particular state. To power the circuitry 114 and the state control circuitry 116, the stylus 110 includes a battery 122.

In implementations, the state determination circuitry 120 processing includes one or more of: measuring a strength of a signal, computing a peak voltage for a signal, determining a relative proximity of a stylus to a digitizer, calculating a value that represents an amplitude of a signal, comparing values to thresholds correlated to states and/or proximity, and ascertaining a particular state. Processing performed by the state determination circuitry 120 can be performed over a particular time period. The thresholds can include values related to a noise level and/or a relative proximity and in some instance are pre-defined and/or pre-determined. Thus, different thresholds can be used in different implementations to determine a state based upon a noise threshold value and/or a relative proximity threshold value. In this way, the state control circuitry 116 can be implemented to determine a relative proximity of a stylus to a digitizer based on a correlation between a strength, peak voltage, and/or amplitude of a signal to a relative proximity threshold value and/or a noise threshold value.

The stylus 110 is also illustrated as including a usage module 124. The usage module 124 is representative of functionality of the stylus 110 to enter different usage states and/or modes. For example, the usage module 124 may support stylus states 126 in which circuitry 114 of the stylus 110 is made active and/or inactive and therefore permitted to consume and/or conserve power from the battery 122. The usage module 124 may support battery modes 128 in which circuitry 114 of the stylus 110 is made available or unavailable in dependence upon whether the battery modes 128 indicate to consume or conserve power from the battery 122.

The stylus 110 as illustrated also includes sensor(s) 130. A variety of different techniques may be employed by the sensor 130 to receive signals available for detection in a vicinity of the stylus 110. For example, the state control circuitry 116 may employ the sensor 130 to receive signals from the display device 106. In implementations, the sensor 130 may assume a variety of different configurations to detect the signals from the display device 106 at different frequency ranges, further discussion of which may be found in relation to the following figures.

In one approach, the state control circuitry 116 ascertains a state for the stylus 110 based on a proximity of the stylus 110 to the display device 106. For example, the relative proximity of the stylus can be determined by processing signals emitted from the display device 106. The usage module 124 may then cause the stylus to enter an active state (e.g., "wake-up") when the stylus is detected in relative proximity to the display device 106, and enter a battery-conservation mode (e.g., "sleep" or "shut-down") when the stylus is not (e.g., after a defined time period has elapsed). For example, when the stylus is detected within a defined range of approximately 3 to 6 inches to the digitizer 202, the usage module 124 causes the stylus to enter the active state. The usage module 124 can also cause the stylus 110 to enter the battery-conservation mode when the stylus is positioned outside the defined range, such as when the stylus is positioned at a distance greater than approximately 6 inches from the display device 106. Thus, different battery usage and conservation modes can be implemented in dependence upon a state of the stylus. Further, the state control circuitry 116 can be implemented as a "wake-up" circuit for use in changing stylus states.

In an implementation, the state control circuitry 116 causes the stylus 110 to toggle between multiple supported states through communication with the usage module 124. For instance, state control circuitry 116 can share data with the usage module 124 that indicates a state determined by the state control circuitry 116. The shared data can then be used by the usage module 124 to cause the circuitry 114 and/or the battery 122 to behave according to one of the stylus states 126 and/or the battery modes 128. The state control circuitry 116 can also consume power from the battery 122 independent of the usage states and/or modes determined by the usage module 124.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the stylus mode techniques described below are platform-independent, meaning that the techniques may be implemented on a variety of commercial computing platforms having a variety of processors.

Figure 2:
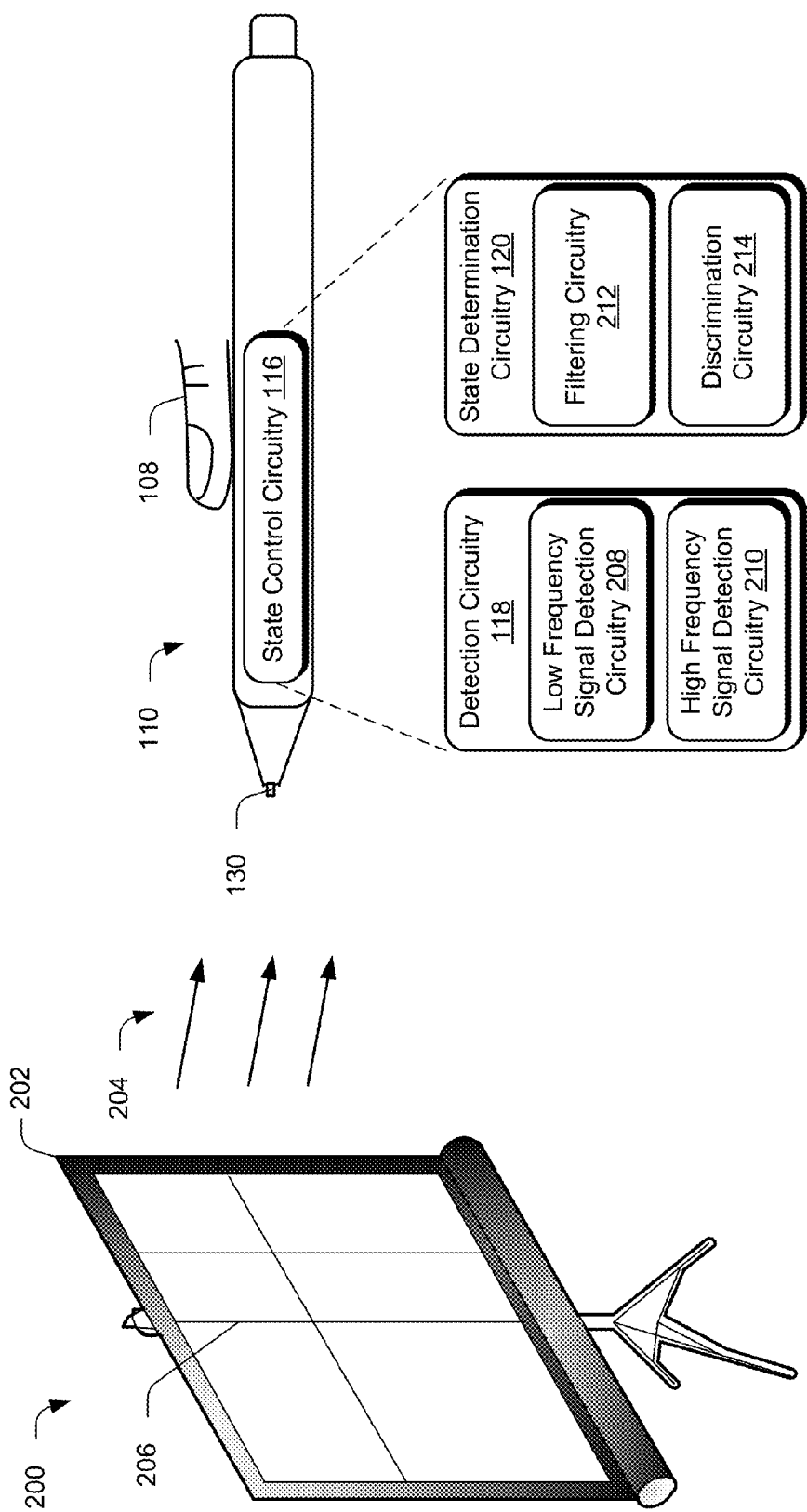
FIG. 2 depicts a stylus of FIG. 1 in an example implementation showing an example configuration of circuitry in accordance with one or more implementations.

FIG. 2 depicts generally at 200 a stylus of FIG. 1 showing an example configuration of circuitry in accordance with one or more implementations. In this example, the stylus 110 held by user's hand 108 is in a relative proximity to a digitizer 202 which emits signals 204 from transmitters and/or antennae 206 positioned in the digitizer 202. The sensor 130 receives the signals 204 emitted from the digitizer 202 and forwards them to the state control circuitry 116. To detect the signals 204 in different frequency ranges, low frequency signal detection circuitry 208 and high frequency signal detection circuitry 210 are employed as part of the detection circuitry 118. The state determination circuitry 120 as illustrated includes filtering circuitry 212 and discrimination circuitry 214 usable for processing the signals 204 to ascertain a state of the stylus 110. The digitizer is generally representative of a display device, touch screen device, and so forth and can be configured for use with or without a computing device.

In the example of FIG. 2, the stylus 110 detects low and/or high frequency signals without contacting the digitizer 202. For instance, during a hover or while being held at a distance from the digitizer 202, the detection circuitry 118 detects the signals 204 independent of the frequency range. Then, the state determination circuitry 120 processes the signals 204 to ascertain a state of the stylus 110. Processing the signals 204 by the state determination circuitry 120 can include employing the filtering circuitry 212 to remove interference associated with the detected signals and employing the discrimination circuitry 214 to compare the filtered signals to a relative proximity threshold and/or a noise threshold value to ascertain a state for the stylus 110, further discussion of which is discussed below in FIG. 3.

The transmitters and/or antennae 206 can be arranged in the digitizer 202 in a variety of configurations and generally represent a variety of technology that can be utilized to transmit signals. In implementations, the transmitters and/or antennae 206 emit a high frequency duty-cycled signal, which is used to detect a touch input to the digitizer 202. In addition, or alternatively, the transmitters and/or antennae 206 can emit a low frequency signal that is representative of a noisy signal. Here, the noisy signal can be representative of electrostatic signals emitted from the digitizer 202.

In the example of FIG. 2, the stylus 110 uses the low frequency signal detection circuitry 208 to detect low frequency signals in the range of about 100 Hz to 100 kHz. In addition, or alternatively, the high frequency signal detection circuitry 210 operates to receive and detect high frequency signals at levels above about 100 kHz. For example, a duty cycled high frequency signal emitted by a touchscreen may be configured as a finger touch wakeup transmission signal used traditionally to wake the touchscreen from a sleep mode in response to a finger touch. The finger touch transmission signal can be detected by the state control circuitry 116 independent of whether the stylus 110 makes contact with the touchscreen. Thus, the detection circuitry 118 receives and detects signals 204 in a large frequency range found in detectable signals and therefore can be implemented to support different modes of operation in dependence upon a specific frequency application.

Figure 3:
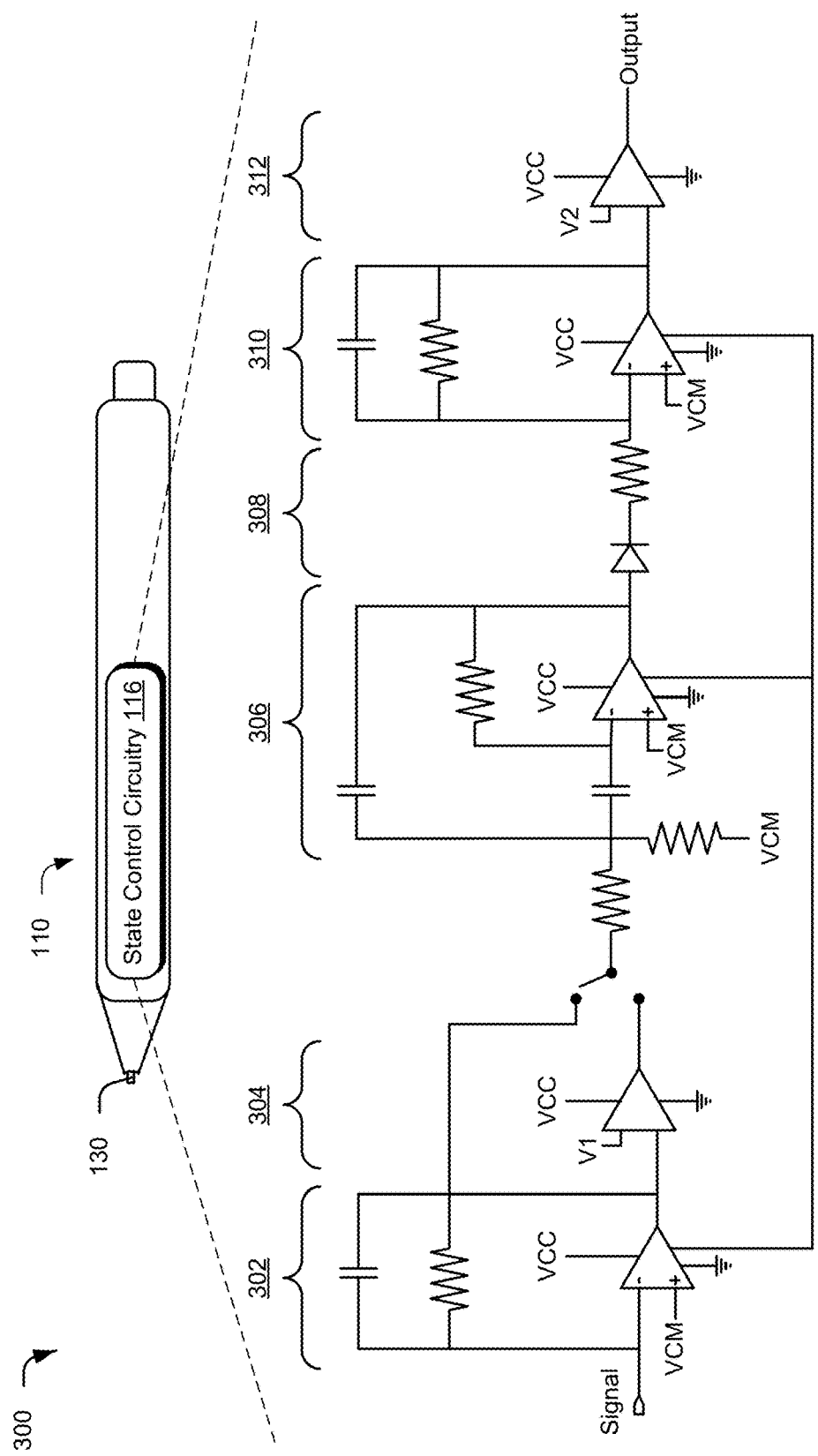
FIG. 3 depicts a stylus of FIG. 1 in another example implementation showing an example configuration of circuitry to receive and process a signal to control a state of a stylus.

FIG. 3 depicts generally at 300 a stylus of FIG. 1 that includes an example configuration of circuitry to receive and process a signal to control a state of the stylus. In this example, the state control circuitry 116 of the stylus 110 includes a transimpedance amplifier 302 (TIA), an optional comparator 304, filtering circuitry 306, peak detector 308, integrator circuitry 310, and comparator 312. Generally, the state control circuitry 116 includes common mode voltage VCM, input voltage VCC, and other voltage inputs V1 and V2, which are usable by the optional comparator 304 and the comparator 312.

As illustrated in FIG. 3, the transimpedance amplifier 302 is usable to detect a signal emitted by a digitizer or display device. In implementations, the transimpedance amplifier 302 receives low or high frequencies signal data from the sensor 130 of stylus 110. For instance, the transimpedance amplifier 302 can be configured to detect signals through a small capacitance on the order of tens of Femto-farads between the receiving sensor and the transmitter in the digitizer. In this way, the transimpedance amplifier 302 is configured to detect a signal emitted by a digitizer at distances up to about 10 centimeters.

The optional comparator 304 represents amplifying circuit to amplify the signal output from the transimpedance amplifier. In implementations, the optional comparator 304 is configured to boost the detected signal prior to the signal reaching the filtering circuitry 306. However, the output from the transimpedance amplifier may also bypass the optional comparator 304 in some scenarios and feed directly to the filtering circuitry 306. The filtering circuitry 306 is configured to filter the signal to remove interference emitted by the digitizer and captured by the sensor. For example, the filtering circuitry 306 may include a narrow bandpass filter. Accordingly, the filtering circuitry 306 can be employed to remove interferences found in power supply noise and noises from liquid crystal displays, for instance.

An output of the filtering circuitry 306 is received at the peak detector 308, which as illustrated in FIG. 3 includes a rectifier. In alternative implementations, the rectifier can be substituted for other peak detector circuitry with a constant or triggered discharge. Regardless of how implemented, the peak detector 308 operates to ensure that the signal can be detected by the integrator because without the peak detector 308 the output to the integrator would be negligible and unable to be processed by the integrator. Accordingly, the peak detector 308 may be configured to output a constant signal usable by the integrator for processing.

FIG. 3 also illustrates integrator circuitry 310 operable to aggregate instances of the filtered signal over a particular time period and outputs a value that represents a peak voltage for the emitted signal over the particular time period which is received by the comparator 312. In implementations, the comparator 312 compares the value output by the integrator circuitry 310 to a pre-defined noise threshold value, and based on the comparison, generates a result that is indicative of a state of the stylus. For example, the result can be used to cause the stylus to toggle between active and sleep states in dependence upon whether the value is less than or greater than the pre-defined noise threshold. Thus, the comparator 312 can be configured to cause the state of the stylus to toggle from the sleep state to the active state in dependence upon the value being output from the comparator 312. Toggling to the active state may occur responsive to an output value indicating that the peak voltage for the emitted signal over the particular time period is greater than the pre-defined noise threshold.

Figure 4:
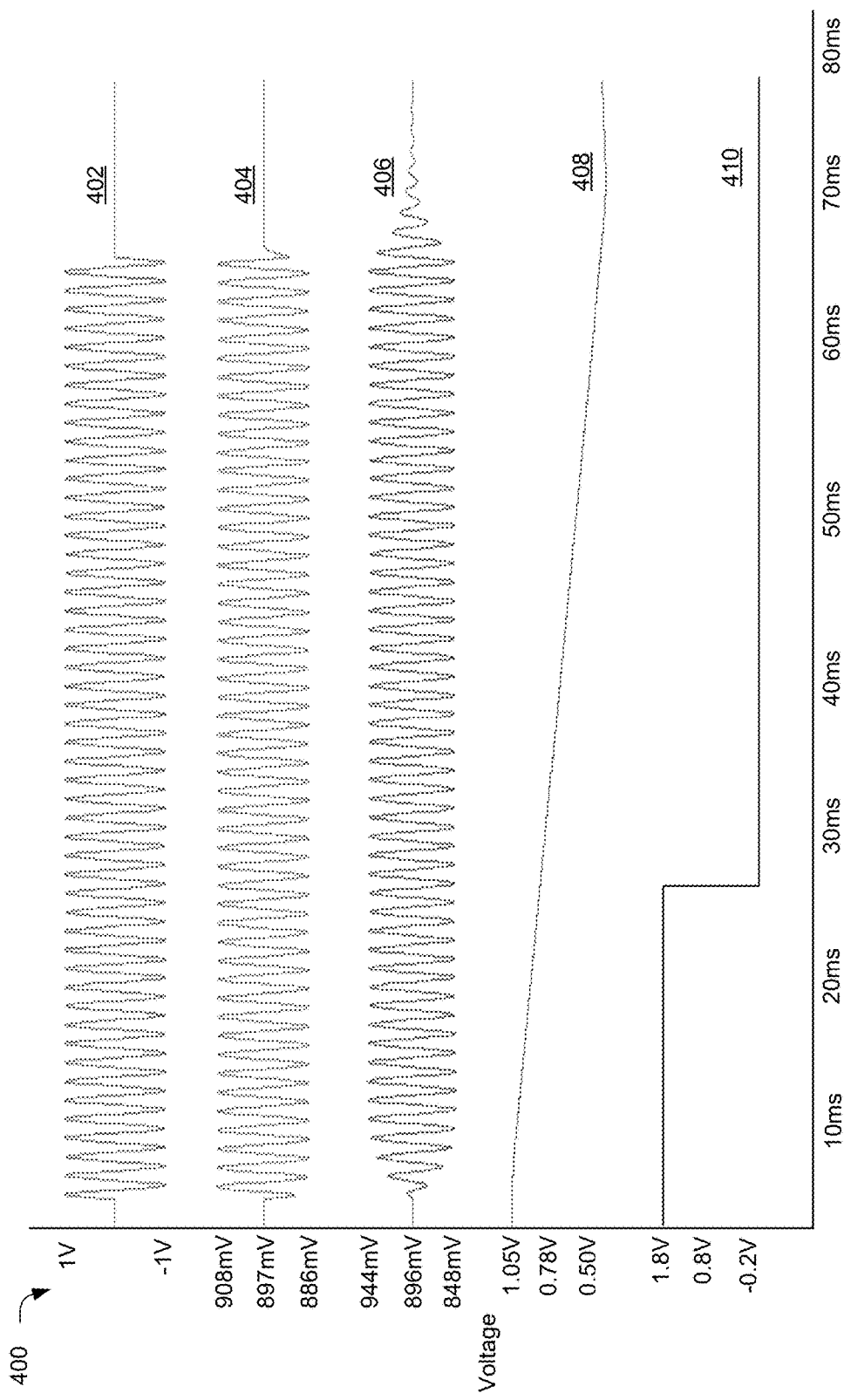
FIG. 4 depicts example timing diagrams in accordance with one or more implementations using state control circuitry to control a particular state of the stylus of FIG. 1.

FIG. 4 depicts example timing diagrams 400 in accordance with one or more implementations using state control circuitry to control a particular state of the stylus of FIG. 1. Voltage input is generally shown at 402 as representing a sinusoidal waveform. Output from the transimpedance amplifier 302 is shown at 404 while a filtered signal is represented at 406, such as a signal output from the filtering circuitry 306. A general representation of an output signal from the integrator circuitry 310 is shown at 408 which determines the result shown at 410 which represents a particular state. As shown at 410, a signal output at a particular voltage can be indicative of a particular stylus state. For instance, each voltage output (or thereof) may correlate to different states and be used by the state control circuitry 116 to provide an indication of a particular state.

Various actions such as processing, comparing, measuring, ascertaining, causing, and so forth performed by various modules are discussed herein. It should be appreciated that the various modules may be configured in various combinations with functionality to cause these and other actions to be performed. Functionality associated with a particular module may be further divided among different modules and/or the functionality represented by multiple modules may be combined together into a single logical module. Moreover, a particular module may be configured to cause performance of action directly by the particular module. In addition, or alternatively, the particular module may cause particular actions by invoking or otherwise accessing other components or modules to perform the particular actions (or perform the actions in conjunction with that particular module).

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

In portions of the following discussion, reference may be made to the examples of FIGS. 1-4. In at least some implementations, procedures 500 and/or 600 may be performed by a suitably configured computing device such as computing device 102 of FIG. 1 having state control circuitry 116 or as described in relation to FIG. 7.

Figure 5:
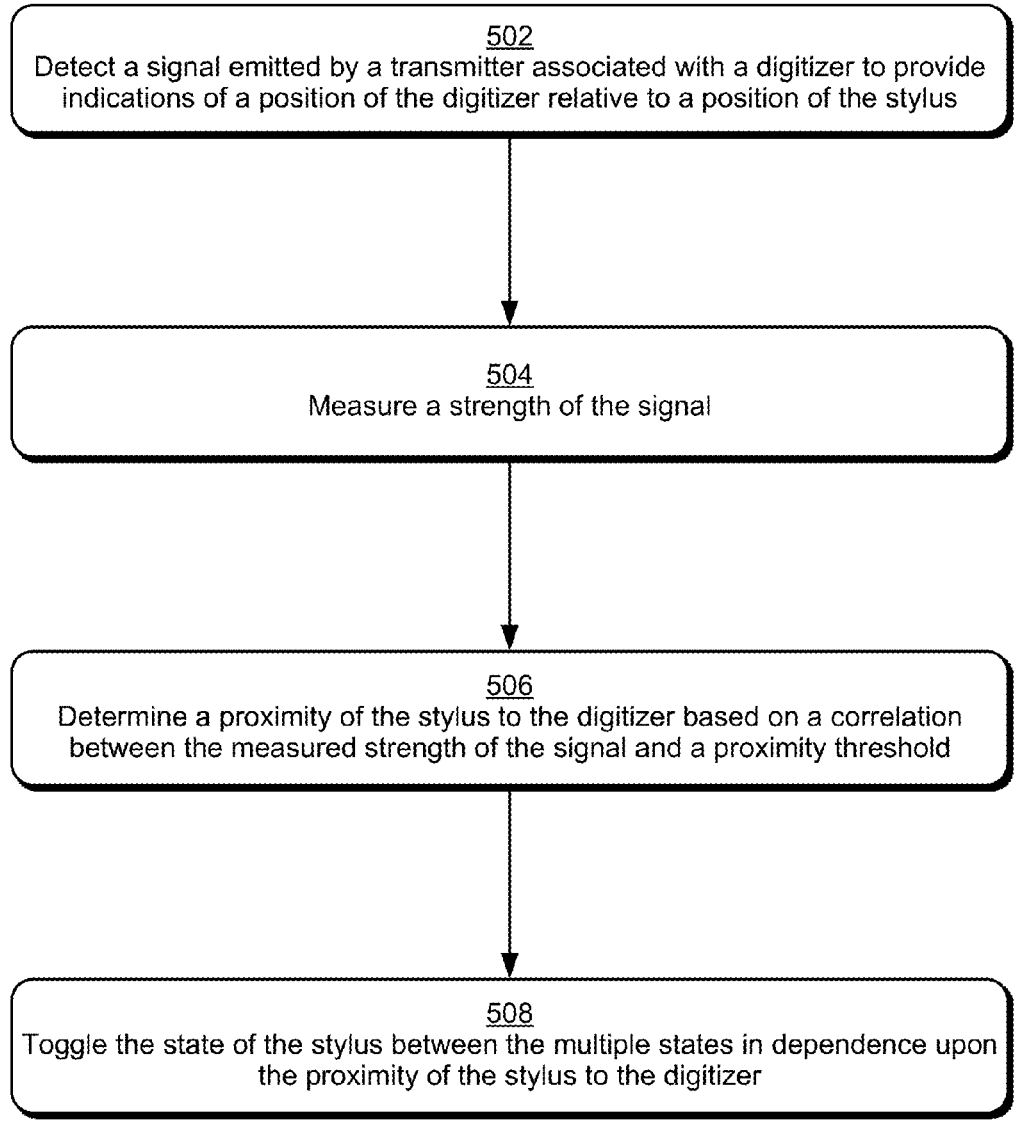
FIG. 5 is a flow diagram depicting a procedure in an example implementation in which a state of a stylus is determined in dependence upon a relative proximity of the stylus to a digitizer.

FIG. 5 is a flow diagram depicting an example procedure 500 in which a state of a stylus is determined in dependence upon a relative proximity of the stylus to a digitizer. A signal emitted by a transmitter associated with a digitizer to provide indications of a position of the digitizer relative to a position of a stylus is detected by the stylus (block 502). For example, the state control circuitry 116 may detect a signal emitted from the digitizer 202 when the stylus 110 is within a defined range of approximately 3 to 6 inches to the digitizer 202. Signals emitted from the digitizer 202 may also be detected by the state control circuitry 116 at distances greater than the defined range to process the signals to determine a relative proximity for the stylus 110 relative to the digitizer 202. A strength of the signal is measured (block 504). For instance, in one or more implementations, the state control circuitry 116 processes the signal using any of the techniques described herein. In one approach, the state control circuitry 116 measures an amplitude of the signal and/or measures a peak voltage for the signal over a particular time period. In embodiments, measuring the peak voltage for the signal over the particular time period includes employing the state control circuitry 116 to calculate a single peak voltage value that represents voltage values for multiple amplitudes detected in the signal over a time period.

In implementations, a relative proximity of the stylus to the digitizer is determined based on a correlation between the measured strength of the signal and a relative proximity threshold (block 506). In one specific implementation, the state control circuitry 116 employs the filtering circuitry 306, the peak detector 308, and the comparator 312 to a received signal and compares the measured strength of the signal to a relative proximity threshold. For instance, a voltage value representing the measured signal strength is compared to one or more relative proximity thresholds that correspond to a relative proximity of the stylus. In another example, a counter may be employed to count repetitions of the repeating signal pattern of time as an indication of signal strength. A further approach involves using timing signals and aggregating the signals over time to determine the signal strength.

The state of the stylus is toggled between the multiple states in dependence upon the relative proximity of the stylus to the digitizer (block 508). For instance, an output from the state control circuitry 116 is received by the usage module 124 to cause the stylus to enter into or switch to a state. In embodiments, the state control circuitry 116 can cause the usage module 124 to enter the stylus into sleep and awake states in dependence upon the relative proximity of the stylus to the digitizer. By including the state control circuitry 116 in a stylus, toggling between active and sleep states, among other states, is enabled when the stylus is at various different positions relative to the digitizer.

Figure 6:
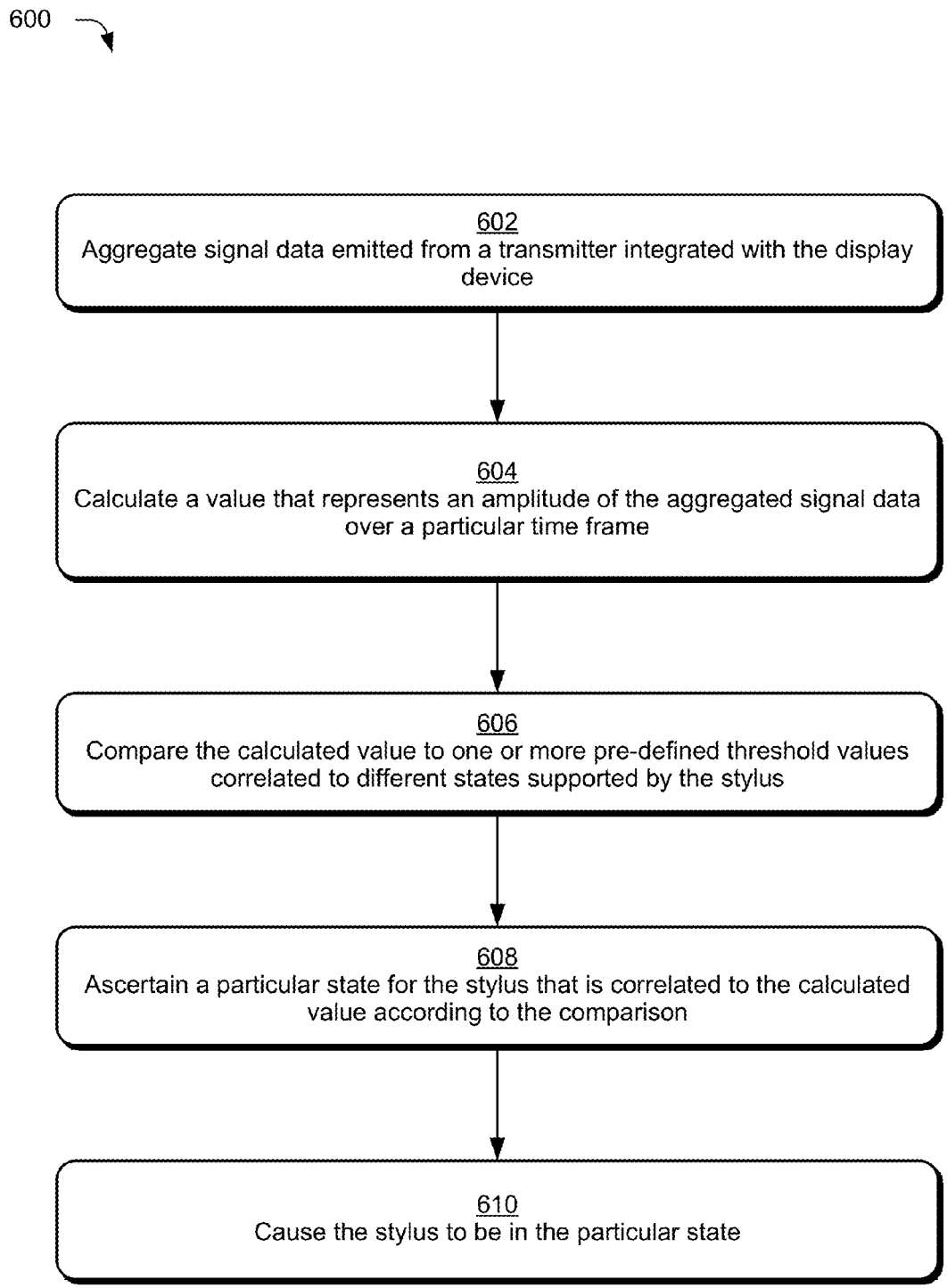
FIG. 6 is a flow diagram depicting a procedure in an example implementation in which a state of a stylus is ascertained according to an amplitude of an aggregated signal.

FIG. 6 is a flow diagram depicting an example procedure 600 in which a state of a stylus is ascertained according to an amplitude of an aggregated signal. Signal data emitted from a transmitter integrated with a display device is aggregated (block 602). For example, signal data associated with signals from display device 106 are emitted by a transmitter and aggregated by the state control circuitry 116. A value is calculated that represents an amplitude of the aggregated signal data over a particular time frame (block 604). For instance, the state control circuitry 116 processes the signal data for a period of time on the order of tens of milliseconds and processes each received waveform associated with the signal data to determine an output signal for a group of waveforms received during the period of time. In an example, a stylus state can be determined by the state control circuitry 116 in less than about 30 ms, thereby enabling a device housing the state control circuit to determine states in near real-time and as a user moves the stylus.

The calculated value is compared to one or more pre-defined threshold values correlated to different states supported by the stylus (block 606). For instance, a noise threshold value or a relative proximity threshold value can be used by the comparator 312 to compute an output value that correlates to a particular state. In one approach, a pre-defined noise threshold value can be used to cause the stylus to toggle between active and sleep states in dependence upon whether the value is less than or greater than the pre-defined noise threshold. Generally, the pre-defined noise threshold value is configured as part of the comparator 312 prior to processing the signal.

A particular state is ascertained for the stylus that is correlated to the calculated value according to the comparison (block 608). For instance, the comparator 312 receives signal data from the integrator circuitry 310 and processes the signal data to compute the output value. In the approach that uses a pre-defined noise threshold value, the comparison results in a single output value that correlates to one of multiple stylus states supported by the stylus 110. As illustrated in FIG. 6, the stylus is caused to be in the particular state (block 610). For instance, the state control circuitry 116 communicates with the usage module 124 which in turn causes the stylus 110 to switch to the ascertained state. In one approach, the usage module 124 also causes the stylus 110 to enter into a battery mode corresponding to the ascertained state of the stylus. Thus, depending upon an amplitude of an aggregated signal, the stylus can be caused to enter into a particular state.

Example System and Device

Figure 7:
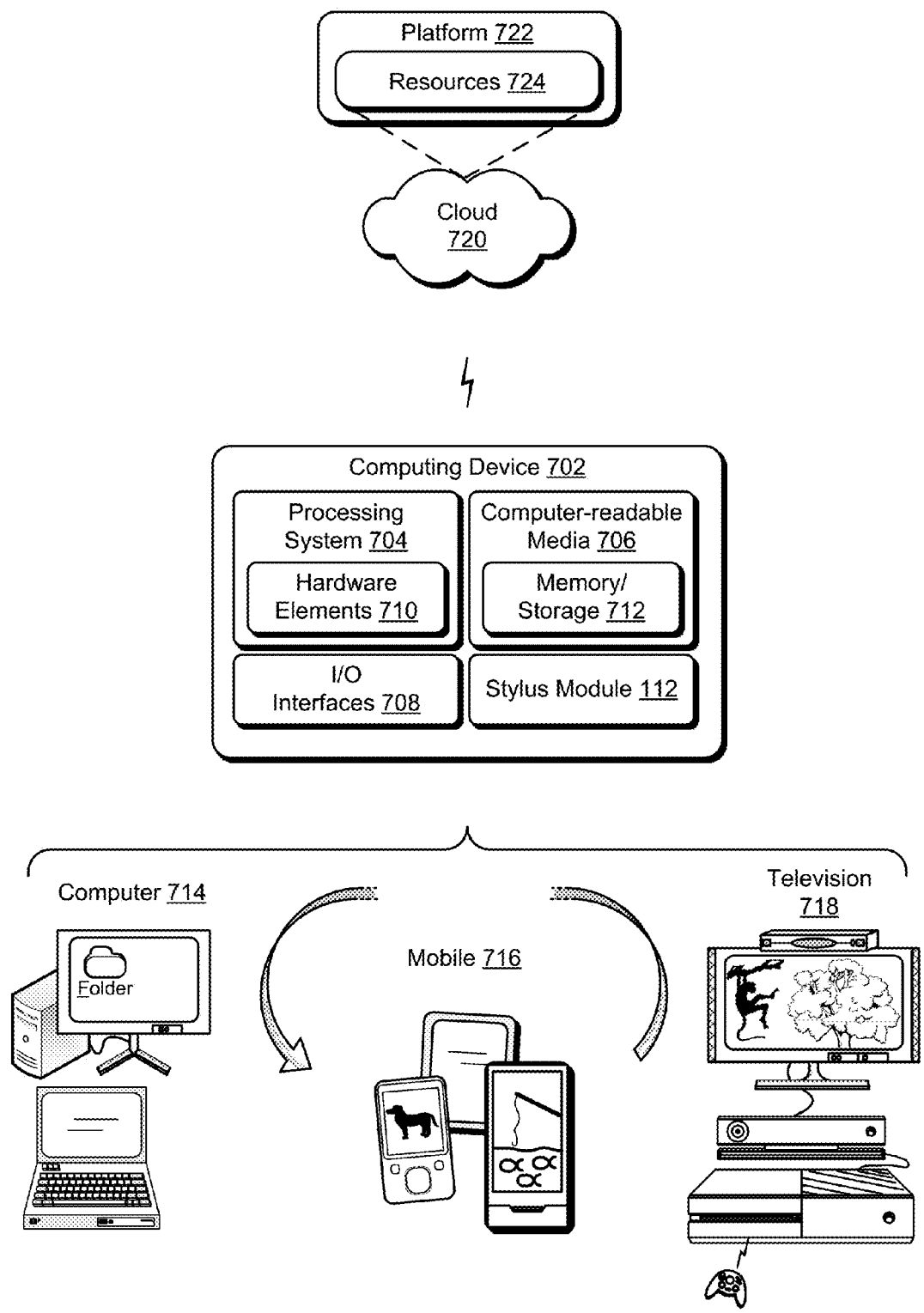
FIG. 7 illustrates various components of an example system that can implement aspects of the circuit techniques described herein in accordance with one or more implementations.

FIG. 7 illustrates an example system 700 that, generally, includes an example computing device 702 that is representative of one or more computing systems and/or devices that may implement the various techniques described herein. This is illustrated through inclusion of the stylus module 112. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors, e.g., electronic integrated circuits (ICs). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media, e.g., Flash memory, a removable hard drive, an optical disc, and so forth. The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in one or more implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This is illustrated through inclusion of the stylus module 112 the computing device 702. The functionality represented by the stylus module 112 and other modules/applications may also be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

Implementations discussed herein include:

Example 1

A stylus comprising: circuitry to enable use of the stylus as an input device for a computing device via a digitizer connected to the computing device; a detector circuit configured to operations including: receiving a signal transmitted by a transmitter associated with the digitizer; and processing the received signal to control a state of the stylus, the processing including: computing a peak voltage for the emitted signal over a particular time period; and toggling the state of the stylus between multiple states supported by the stylus in dependence upon the peak voltage.

Example 2

The stylus as described in example 1, wherein the detector circuit includes a transimpedance amplifier to receive the signal transmitted by the transmitter associated with the digitizer.

Example 3

The stylus as described in one or more of examples 1 or 2, wherein processing the received signal further includes to filter the received signal for removing interference transmitted by the transmitter.

Example 4

The stylus as described in one or more of examples 1-3, wherein processing the received signal further includes to compare the peak voltage for the emitted signal to a noise threshold value to determine a particular state for the stylus and to cause the stylus to toggle to the particular state according to the comparison.

Example 5

The stylus as described in one or more of examples 1-4, wherein the signal transmitted by the transmitter associated with the digitizer includes an electrostatic signal.

Example 6

The stylus as described in one or more of examples 1-5, wherein the transmitter includes an antennae associated with the digitizer.

Example 7

The stylus as described in one or more of examples 1-6, wherein receiving the signal transmitted by the transmitter associated with the digitizer includes to receive the signal at a constant rate.

Example 8

The stylus as described in one or more of examples 1-7, wherein the digitizer is a touch screen.

Example 9

The stylus as described in one or more of examples 1-8, wherein the multiple states supported by the stylus include a sleep state and an active state.

Example 10

A method implemented by a stylus to control a state of the stylus among multiple states supported by the stylus, the method comprising: detecting a signal emitted by a transmitter associated with a digitizer to provide indications of a position of the digitizer relative to a position of the stylus, the stylus operable via the digitizer as an input device for a computing device; measuring a strength of the signal; determining a relative proximity of the stylus to the digitizer based on a correlation between the measured strength of the signal and a relative proximity threshold; and toggling the state of the stylus between the multiple states in dependence upon the relative proximity of the stylus to the digitizer.

Example 11

The method as described in example 10, wherein measuring the strength of the signal includes measuring the strength of the signal independent of the stylus contacting the digitizer.

Example 12

The method as described in one or more of examples 10 or 11, wherein measuring the strength of the signal includes aggregating and filtering the signal over a particular time period.

Example 13

The method as described in one or more of examples 10-12, wherein detecting the signal emitted by the transmitter includes detecting an electrostatic signal emitted by the transmitter.

Example 14

The method as described in one or more of examples 10-13, wherein the signal is a low frequency signal that is transmitted through an electrode associated with the digitizer.

Example 15

The method as described in one or more of examples 10-14, wherein the signal emitted by the digitizer includes a duty cycled high frequency signal.

Example 16

The method as described in one or more of examples 10-15, wherein the duty cycled high frequency signal emitted by the digitizer is representative of a finger touch wakeup transmission signal.

Example 17

A method implemented by circuit disposed in a stylus operable to supply input for computing operations in conjunction with a display device, the method comprising: aggregating signal data emitted from a transmitter integrated with the display device; calculating a value that represents an amplitude of the aggregated signal data over a particular time period; comparing the calculated value to one or more pre-defined threshold values correlated to different states supported by the stylus; ascertaining a particular state for the stylus that is correlated to the calculated value according to the comparison; and causing the stylus to operate in the particular state.

Example 18

The method as described in example 17, wherein aggregating, the calculating, the comparing, and the ascertaining are performed while the stylus is hovering over the display device.

Example 19

The method as described in one or more of examples 17 or 18, wherein the particular state is a sleep state and the method further comprising, responsive to the stylus being in the sleep state, causing a battery in the stylus to enter a battery sleep mode during which the battery is conserved.

Example 20

The method as described in one or more of examples 17-19, wherein the particular state is an active state and the method further comprising, responsive to the stylus entering the active state, causing the battery in the stylus to enter an active mode during which the battery provides power to the available features of the stylus.

CONCLUSION

Although the techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter, and other equivalent features and methods are intended to be within the scope of the appended claims. Further, various different embodiments are described and it is to be appreciated that each described embodiment can be implemented independently or in connection with one or more other described embodiments.

What is claimed is:

1. A stylus comprising:
   circuitry to enable use of the stylus as an input device for a computing device via a digitizer connected to the computing device;
   a detector circuit configured to perform operations including:
      receiving a signal transmitted by a transmitter associated with the digitizer; and
      processing the received signal to control a state of the stylus, the processing including:
         aggregating the received signal over a particular time period via an integrator circuitry;
         computing a peak voltage for the aggregated signal over the particular time period; and
         toggling the state of the stylus between multiple states supported by the stylus in dependence upon the peak voltage.

2. The stylus as described in claim 1, wherein the detector circuit includes a transimpedance amplifier to receive the signal transmitted by the transmitter associated with the digitizer.

3. The stylus as described in claim 1, wherein processing the received signal further includes to filter the received signal for removing interference transmitted by the transmitter.

4. The stylus as described in claim 1, wherein processing the received signal further includes to compare the peak voltage for the aggregated signal to a noise threshold value to determine a particular state for the stylus and to cause the stylus to toggle to the particular state according to the comparison.

5. The stylus as described in claim 1, wherein the signal transmitted by the transmitter associated with the digitizer includes an electrostatic signal.

6. The stylus as described in claim 1, wherein the transmitter includes an antennae associated with the digitizer.

7. The stylus as described in claim 6, wherein receiving the signal transmitted by the transmitter associated with the digitizer includes to receive the signal at a constant rate.

8. The stylus as described in claim 1, wherein the digitizer is a touch screen.

9. The stylus as described in claim 1, wherein the multiple states supported by the stylus include a sleep state and an active state.

10. A method implemented by a stylus to control a state of the stylus among multiple states supported by the stylus, the method comprising:
    detecting a signal emitted by a transmitter associated with a digitizer to provide indications of a position of the digitizer relative to a position of the stylus, the stylus operable via the digitizer as an input device for a computing device;
    aggregating the detected signal over a particular time period via an integrator circuitry;
    measuring a strength of the signal;
    determining a relative proximity of the stylus to the digitizer based on a relationship between the measured strength of the signal and a relative proximity threshold; and
    toggling the state of the stylus between the multiple states in dependence upon the relative proximity of the stylus to the digitizer.

11. The method as described in claim 10, wherein measuring the strength of the signal includes measuring the strength of the signal independent of the stylus contacting the digitizer.

12. The method as described in claim 10, wherein measuring the strength of the signal includes filtering the signal over the particular time period.

13. The method as described in claim 10, wherein detecting the signal emitted by the transmitter includes detecting an electrostatic signal emitted by the transmitter.

14. The method as described in claim 10, wherein the signal is a low frequency signal in the range of about 100 Hz to 100 kHz that is transmitted through an electrode associated with the digitizer.

15. The method as described in claim 10, wherein the signal emitted by the transmitter includes a duty cycled high frequency signal, the high frequency signal being above 100 kHz.

16. The method as described in claim 15, wherein the duty cycled high frequency signal emitted by the transmitter is representative of a finger touch wakeup transmission signal.

17. A method implemented by circuit disposed in a stylus operable to supply input for computing operations in conjunction with a display device, the method comprising:
    aggregating signal data, emitted from a transmitter integrated with the display device, via an integrator circuitry;
    calculating a value that represents an amplitude of the aggregated signal data over a particular time period;
    comparing the calculated value to one or more pre-defined threshold values related to different states supported by the stylus;
    ascertaining a particular state for the stylus that is related to the calculated value according to the comparison; and
    causing the stylus to operate in the particular state.

18. The method as described in claim 17, wherein the aggregating, the calculating, the comparing, and the ascertaining are performed while the stylus is hovering over the display device.

19. The method as described in claim 17, wherein the particular state is a sleep state and the method further comprising, responsive to the stylus being in the sleep state, causing a battery in the stylus to enter a battery sleep mode during which the battery is conserved.

20. The method as described in claim 17, wherein the particular state is an active state and the method further comprising, responsive to the stylus entering the active state, causing the battery in the stylus to enter an active mode during which the battery provides power to the available features of the stylus.

\* \* \* \* \*